United States Patent
Okada

(10) Patent No.: US 8,403,574 B2
(45) Date of Patent: Mar. 26, 2013

(54) CAMERA BODY, ACCESSORY, CAMERA SYSTEM, AND INFORMATION REWRITING METHOD

(75) Inventor: Kouji Okada, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 196 days.

(21) Appl. No.: 13/048,330

(22) Filed: Mar. 15, 2011

(65) Prior Publication Data

US 2011/0229114 A1   Sep. 22, 2011

(30) Foreign Application Priority Data

Mar. 17, 2010   (JP) .................... 2010-061058

(51) Int. Cl.
*G03B 17/56* (2006.01)
(52) U.S. Cl. .............. 396/530; 396/71; 396/91
(58) Field of Classification Search .......... 396/530
See application file for complete search history.

(56) References Cited

U.S. PATENT DOCUMENTS

| | | | | |
|---|---|---|---|---|
| 5,382,994 A | * | 1/1995 | Naito et al. | 396/530 |
| 5,731,920 A | * | 3/1998 | Katsuragawa | 359/827 |
| 7,796,350 B2 | * | 9/2010 | Yumiki et al. | 359/808 |
| 2005/0025472 A1 | * | 2/2005 | Sugita et al. | 396/71 |
| 2009/0268078 A1 | * | 10/2009 | Miyazaki et al. | 348/345 |
| 2011/0103789 A1 | * | 5/2011 | Honjo et al. | 396/530 |

FOREIGN PATENT DOCUMENTS

| | | |
|---|---|---|
| JP | 63-199336 A | 8/1988 |
| JP | 2002-341424 A | 11/2002 |

* cited by examiner

*Primary Examiner* — Clayton E Laballe
*Assistant Examiner* — Bret Adams
(74) *Attorney, Agent, or Firm* — Canon USA Inc. IP Division

(57) ABSTRACT

A camera system including a camera body, an interchangeable lens, and an accessory mounted between the camera body and the interchangeable lens, wherein the accessory has a signal processing unit configured to process a signal input into the accessory and a storage unit configured to store information to be used when performing the signal processing, the camera system further including a pseudo interchangeable lens which can be mounted on the accessory instead of the interchangeable lens and which is configured to supply power from the camera body to the accessory when mounted on the camera body via the accessory, and a control unit configured to, while the camera body, the accessory, and the pseudo interchangeable lens are connected, when the accessory receives within a predetermined duration predetermined information, enable communication between the camera body and the accessory even after the predetermined duration has elapsed, and rewrite the information stored in the storage unit.

6 Claims, 5 Drawing Sheets

CAMERA BODY, ACCESSORY, CAMERA SYSTEM, AND INFORMATION REWRITING METHOD

BACKGROUND OF THE INVENTION

1. Field of the Invention

The present invention relates to a camera body, an accessory mounted between a camera body and an interchangeable lens, and a camera system including a camera body and an accessory.

2. Description of the Related Art

Conventionally, in a camera system configured so that communication between a camera body and an interchangeable lens is possible, optical specific information about the interchangeable lens is stored as an electronic data in the interchangeable lens. This optical specific information may be, for example, data indicating a relationship between a lens movement amount and a focus movement amount, data relating to a focus correction amount, focal length data, and aperture data. By transmitting such specific information to the camera at a suitable timing, autofocus (AF), autoexposure (AE) and the like are performed.

Further, an accessory is sometimes mounted between the camera body and the interchangeable lens. In such a case, the optical specific information about the interchangeable lens and the accessory put together is different from the optical specific information about the interchangeable lens alone. Consequently, a camera body or an interchangeable lens detects an accessory connection and corrects the above optical specific information.

However, when a camera body and an interchangeable lens with an old design and an accessory with a new design are used in combination, there is the problem that correction of such optical specific information cannot be performed. Here, the expression "new design" and "old design" is used with the following meaning. Specifically, "new design" refers to a newly designed accessory (new-design accessory) that cannot be detected by a conventional camera body or interchangeable lens (old-design camera body and interchangeable lens), or that does not have a correction value.

To resolve this problem, Japanese Patent Application Laid-Open No. 63-199336 discusses a system having a central processing unit (CPU) in an accessory, in which optical specific information relating to an accessory is rewritten by converting only the necessary communication between a camera and an interchangeable lens during communication. Further, Japanese Patent Application Laid-Open No. 2002-341424 discusses, when a camera body and an interchangeable lens system are older than an accessory, correcting optical specific information about the interchangeable lens in the accessory and transmitting the corrected information to the camera.

Due to manufacturing dispersion or errors of each individual camera, lens, and accessory, the optical specific information sometimes needs to be changed. In such a case, the correction data in the accessory needs to be rewritten based on the old/new restrictions in a system as described above. Further, to ensure the flexibility of the system, it is desirable that the data and the firmware in the accessory can be updated even after the accessory is in a user's possession. In addition, to perform such an update without a special input terminal or an additional part, it is necessary to operate the accessory via an existing camera mount.

Accessories are usually operated only after the camera body and the interchangeable lens have been combined. Therefore, to prevent mistaken operation, it is desirable that power flows to the accessory only after the above three units have been mounted together. More specifically, the accessory has amount unit for connecting the interchangeable lens. This mount unit has a switch that is physically turned ON as a result of the interchangeable lens being attached thereto. Further, as discussed in Japanese Patent Application Laid-Open Nos. 63-199336 and 2002-341424, when converting only the necessary communications in the accessory, other communications are directly transmitted from the camera to the lens. For example, if a dedicated command for rewriting the information in the accessory is newly provided, and transmitted from the camera side, the lens will also receive that command. If the lens side does not know that command, a malfunction can occur. Further, when rewriting the information in the accessory during the production process or a service deposit in each place, the interchangeable lens must always be provided on-site. It is a big disadvantage from the viewpoint of manufacturing cost and management cost to prepare the interchangeable lens for only feeding the accessory.

Therefore, instead of an interchangeable lens, a pseudo interchangeable lens could be used to turn the above switch ON. However, if a camera body, an accessory, and a pseudo interchangeable lens are combined, the camera body may not detect an interchangeable lens, so that communication per se may not even start. Further, even if a communication is sent, since a real interchangeable lens is not attached, normal communication is not performed. Normally, in such a case, the accessory either turns itself off to prevent unnecessary power consumption or enters a power saving state. This is because the battery is substantially consumed if an accessory with a pseudo interchangeable lens mounted is left attached to the camera. However, as described above, if the user wants to operate the accessory from the camera side, the accessory is in an inoperable state.

SUMMARY OF THE INVENTION

The present invention is directed to a camera system that can rewrite information in an accessory even in a state in which a pseudo interchangeable lens is mounted on the accessory.

According to an aspect of the present invention, a camera system includes a camera body, an interchangeable lens, and an accessory mounted between the camera body and the interchangeable lens, wherein the accessory has a signal processing unit configured to process a signal input into the accessory and a storage unit configured to store information to be used when performing the signal processing, the camera system further including a pseudo interchangeable lens which can be mounted on the accessory instead of the interchangeable lens and which is configured to supply power from the camera body to the accessory when mounted on the camera body via the accessory, and a control unit configured to, while the camera body, the accessory, and the pseudo interchangeable lens are connected, when the accessory receives within a predetermined duration predetermined information, enable communication between the camera body and the accessory even after the predetermined duration has elapsed, and rewrite the information stored in the storage unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
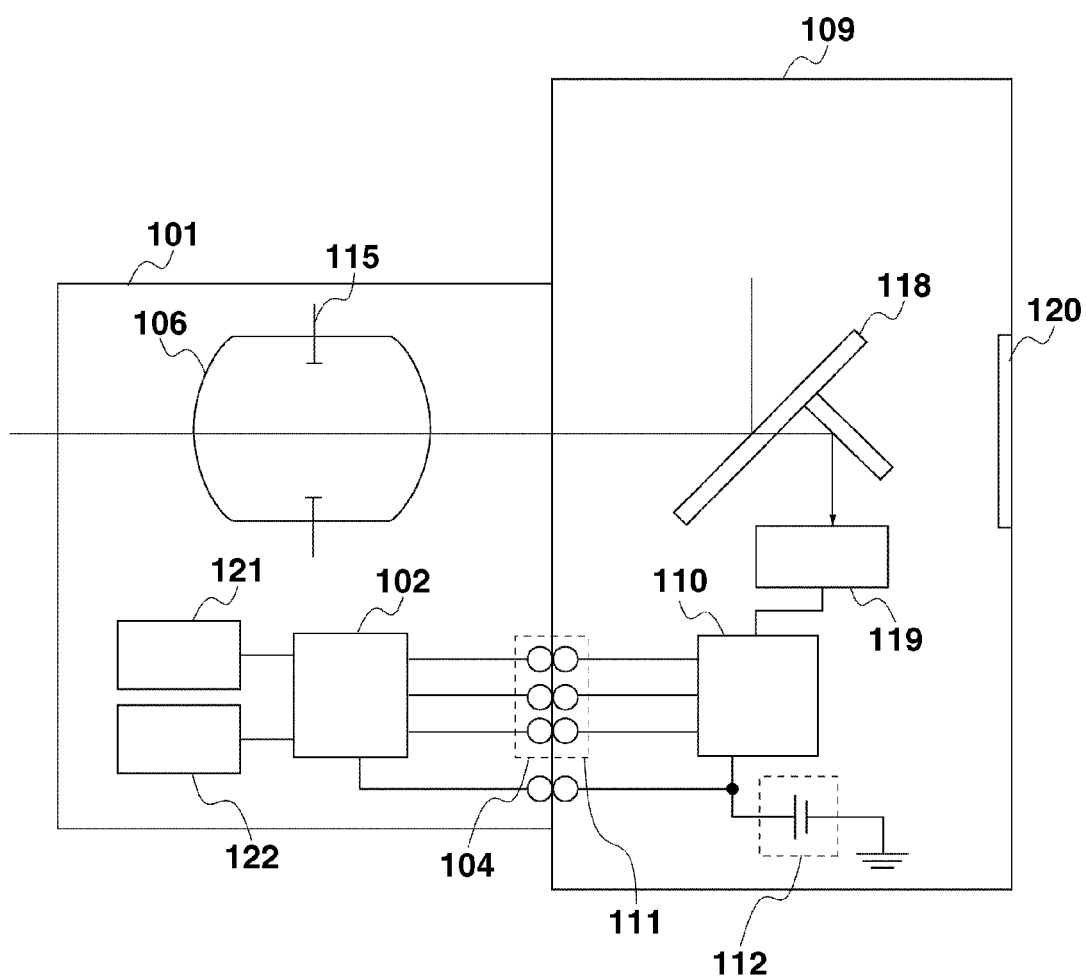
FIG. 1 is a block diagram illustrating a basic configuration of camera-interchangeable lens connection.
Figure 2:
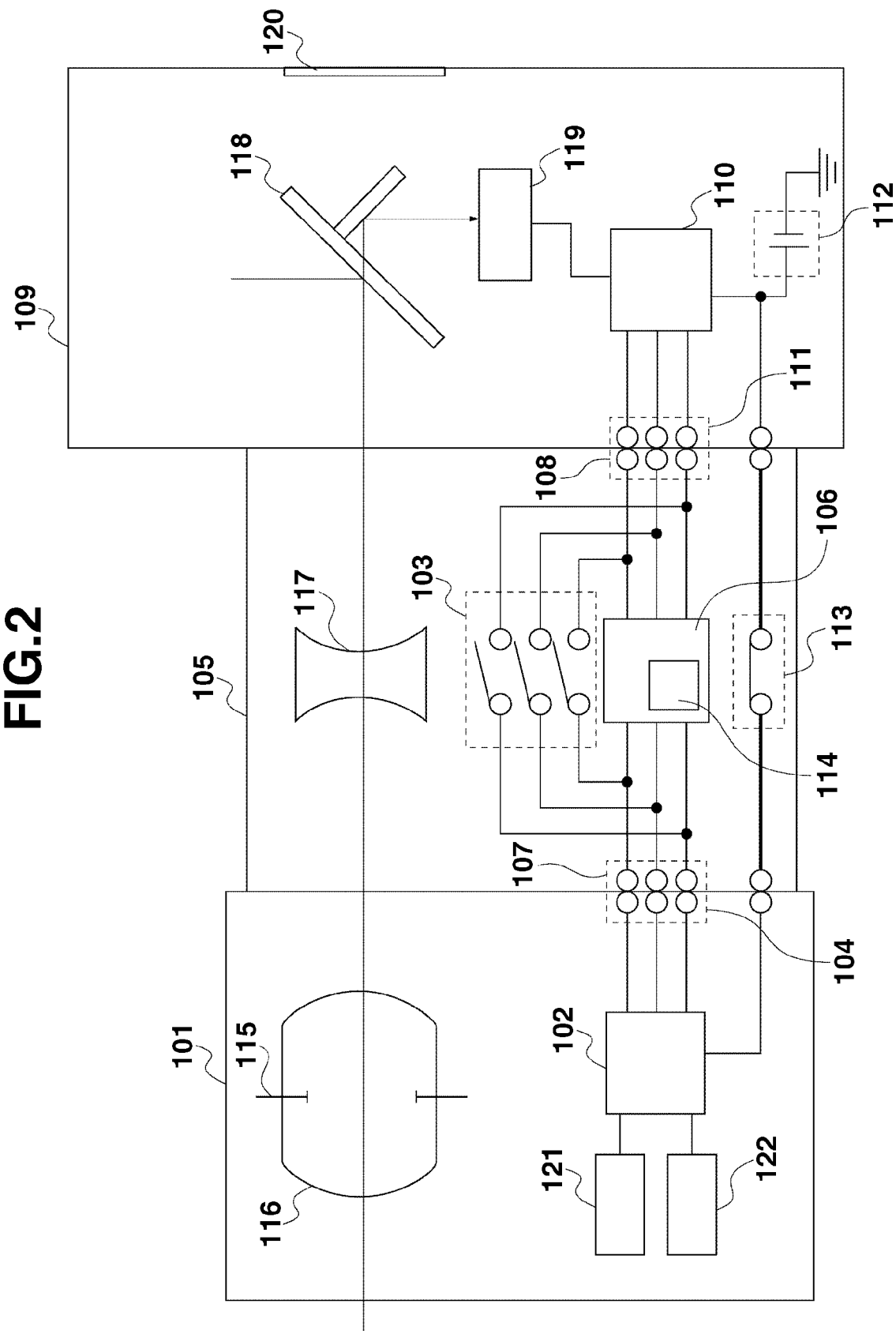
FIG. 2 is a block diagram illustrating a basic configuration of camera-accessory-interchangeable lens connection.

FIGS. 1 and 2 are block diagrams illustrating a basic configuration according to an exemplary embodiment of the present invention. In this camera system, an interchangeable lens 101 and a camera body 109 can communicate via communication terminals 104 and 111, as illustrated in FIG. 1. Generally, the camera system operates by exchanging the respective states of the camera and the lens, optical specific information about the camera and the lens, drive commands and the like based on this communication. Further, a CPU 110 in the camera and a CPU 102 in the lens are supplied with power by a battery 112 in the camera.

The camera system includes the interchangeable lens 101, the camera body 109, and an accessory 105 mounted between the interchangeable lens 101 and the camera body 109. The interchangeable lens 101 includes a lens CPU 102, which controls inside of the interchangeable lens, an optical system 116, which includes an AF lens, a zooming lens, a diaphragm, and a correction lens, and a drive unit for driving these parts. Further, the interchangeable lens 101 includes a zoom position detection brush for detecting the position of the zooming lens, and a focus position detection brush for detecting the position of the AF lens. In addition, the interchangeable lens 101 includes a position detection unit for detecting the position of the correction lens, and a shake detection unit for detecting interchangeable lens shake.

The camera body 109 includes, for example, a camera CPU 110, which controls the camera system, a shutter mechanism for limiting the exposure time of a not-illustrated light-metering unit, a range-finding unit, and an image sensor (e.g., a charge-coupled device (CCD) or a complementary metal-oxide-semiconductor (CMOS) sensor), and a display unit for displaying various information about the camera.

Examples of the accessory 105 include a wide converter, a teleside converter, a close-up lens, and an extender, each having an optical system 117.

Optical specific information about the interchangeable lens is stored in a not-illustrated storage unit (e.g., a flash read-only memory (ROM) that can be electrically rewritten) in the lens CPU 102. This optical specific information is transmitted to the camera CPU 110 via the communication terminals 104 and 111. The optical specific information may be, for example, data indicating a relationship between a lens movement amount and a focus movement amount, data relating to a focus correction amount, focal length data, and aperture data.

A light beam that has passed through the optical system 116 of the interchangeable lens is split by a main mirror 118 into a light beam guided toward a not-illustrated finder and a light beam guided toward an AF sensor 119. The camera CPU 110 processes an output from the AF sensor 119 to perform focus detection. Then, based on this result and the above-described optical specific information, the camera CPU 110 calculates a drive amount for the AF lens included in the optical system 116 of the interchangeable lens 101.

The camera CPU 110 transmits the calculated lens drive amount to the lens CPU 102 via the communication terminals 111 and 104. The lens CPU 102 drives the AF lens included in the optical system 116 of the interchangeable lens 101 by controlling a lens drive unit 122 based on the received lens drive amount.

Further, when a not-illustrated release switch is pressed so that an imaging command is transmitted to the camera CPU 110, the camera CPU 110 calculates a diaphragm drive amount based on an aperture value set by a not-illustrated light-metering sensor or by the user. Further, the camera CPU 110 transmits the calculated drive amount to the lens CPU 102 via the communication terminals 111 and 104. The lens CPU 102 drives a diaphragm 115 by controlling a diaphragm drive unit 121 based on the received diaphragm drive amount. In addition, the camera CPU 110 drives the main mirror 118 and a not-illustrated shutter arranged on a front face of an image sensor 120, so that the light beam is guided to the image sensor 120, whereby an image is captured.

FIG. 2 illustrates a case in which the accessory 105 is mounted between the interchangeable lens 101 and the camera body 109. At this point, the accessory 105 is connected to the lens-side communication terminal 104 via a communication terminal 107 and to the camera-side communication terminal 111 via a communication terminal 108. Consequently, the interchangeable lens 101, the accessory 105, and the camera body 109 are configured so that they can communicate with each other. A CPU 106 (EXT CPU) in the accessory, which includes a not-illustrated communication device and an arithmetic device, can monitor camera-lens communication. Further, if a communication blocking switch 103 is connected, camera-lens communication is performed directly from the camera to the lens. However, if the communication blocking switch 103 is in a blocking state, camera-lens communication is not directly transmitted. In addition, a power supply start switch 113 is physically turned ON by the attachment of the interchangeable lens 101 to the accessory 105. Consequently, power is supplied to the accessory CPU (EXT CPU) 106 and the lens CPU 102 from the camera battery 112. In the present exemplary embodiment, the term "accessory" refers to an extender.

In FIGS. 1 and 2, optical specific information about an interchangeable lens is stored in a not-illustrated storage unit in the lens CPU 102. This optical specific information may be, for example, data indicating a relationship between a lens movement amount and a focus movement amount, data relating to a focus correction amount, focal length data, and aperture data. Further, the lens CPU 102 communicates with the camera side via the communication terminal 104, and performs drive control for the not-illustrated AF lens, diaphragm and the like based on a control command transmitted from the camera side. The camera CPU 110 communicates with the lens side via the communication terminal 111. Further, the camera CPU 110 calculates the focus position and controls the not-illustrated shutter unit and image sensor.

In FIG. 2, the accessory CPU (EXT CPU) 106 is a signal processing unit for processing signals input into the accessory. The accessory CPU 106 includes a storage unit 114. The storage unit 114 stores information for correcting the optical specific information transmitted from the interchangeable lens and information such as firmware used when performing processing in the EXT CPU 106. As long as the EXT CPU 106 can extract information from the storage unit 114, the storage unit 114 does not have to be provided in the EXT CPU 106. Further, the EXT CPU 106 monitors communication between the interchangeable lens and the camera body via the communication terminals 107 and 108. In addition, the EXT CPU 106 can operate the communication blocking switch 103 to block camera-lens communication (direct communication), so as to control the communication contents between the camera and the lens.

Figure 3:
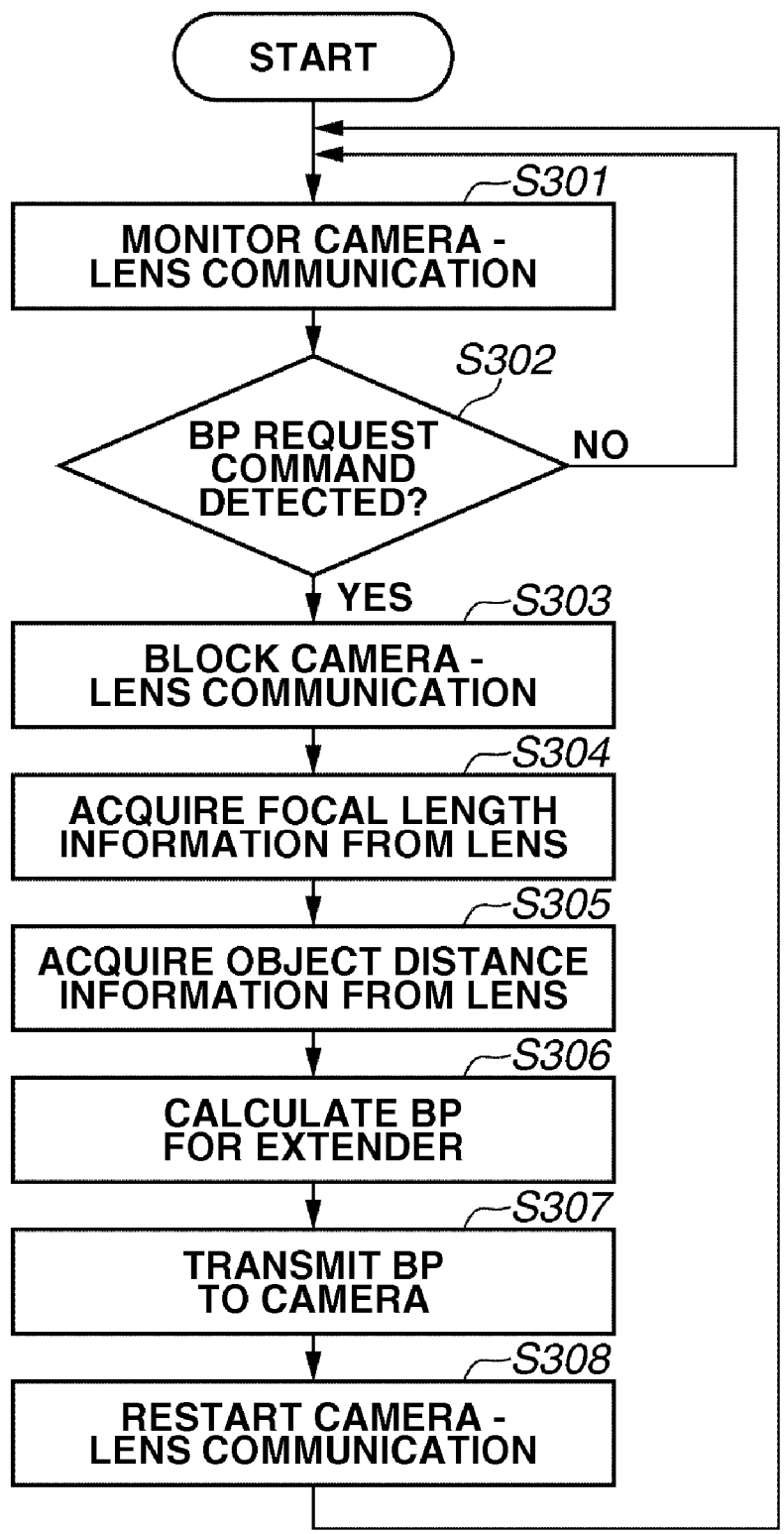
FIG. 3 is a flowchart according to an exemplary embodiment.

Next, a mode in which an extender converts the data (referred to as "BP") relating to the focus correction amount will be described using the flowchart of FIG. 3. First, in step S301, the EXT CPU 106 monitors camera-lens communication via the communication terminals 107 and 108. In step S302, the EXT CPU 106 detects whether during the monitoring a BP request command was transmitted by the camera to the lens. If such a command is detected (YES in step S302), the processing proceeds to step S303. In step S303, the EXT CPU 106 blocks camera-lens communication by operating the communication blocking switch 103. Then, in step S304, the EXT CPU 106 transmits a focal length information request command to the lens CPU 102 to acquire focal length information, which is an essential piece of information for converting the BP. In step S305, the EXT CPU 106 transmits an object distance information request command to the lens CPU 102 to acquire object distance information, which is an essential piece of information for converting the BP. In step S306, based on the acquired focal length information and the object distance information, the EXT CPU 106 calculates a new BP corresponding to the extender. Although in the present exemplary embodiment this new BP is calculated, the new BP may also be obtained by selecting a value from pre-held table data. In step S307, the calculated new BP is transmitted to the camera CPU 110. Once transmission is completed, in step S308, the EXT CPU 106 restarts camera-lens communication by again operating the communication blocking switch 103. Then, the processing returns to step S301, and the EXT CPU 106 continues to monitor camera-lens communication until the camera again transmits a BP request command.

An operation example of the camera system according to the exemplary embodiment of the present invention will now be described with reference to FIGS. 4 and 5.

Figure 4:
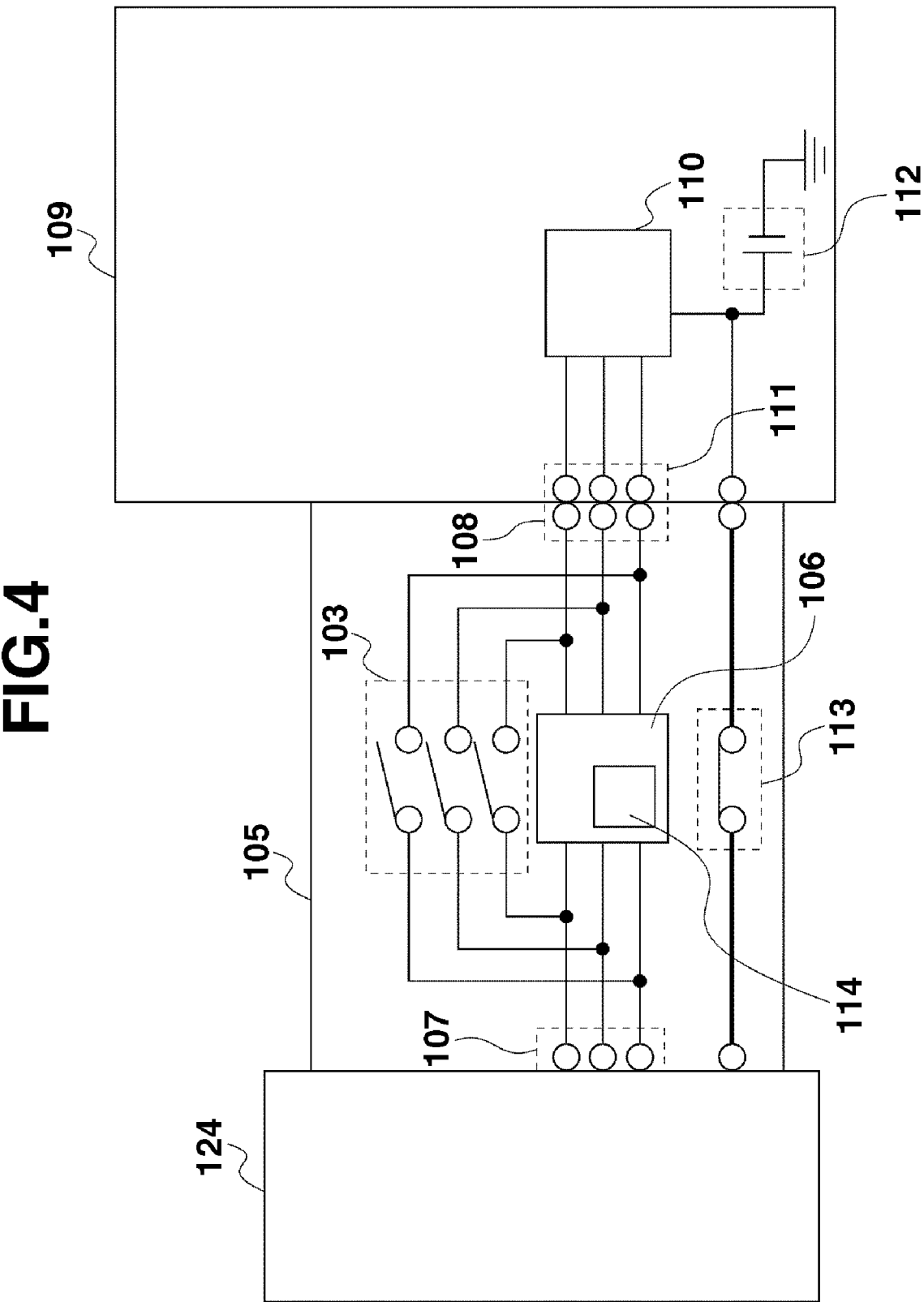
FIG. 4 is a block diagram illustrating a connection configuration according to the exemplary embodiment.
Figure 5:
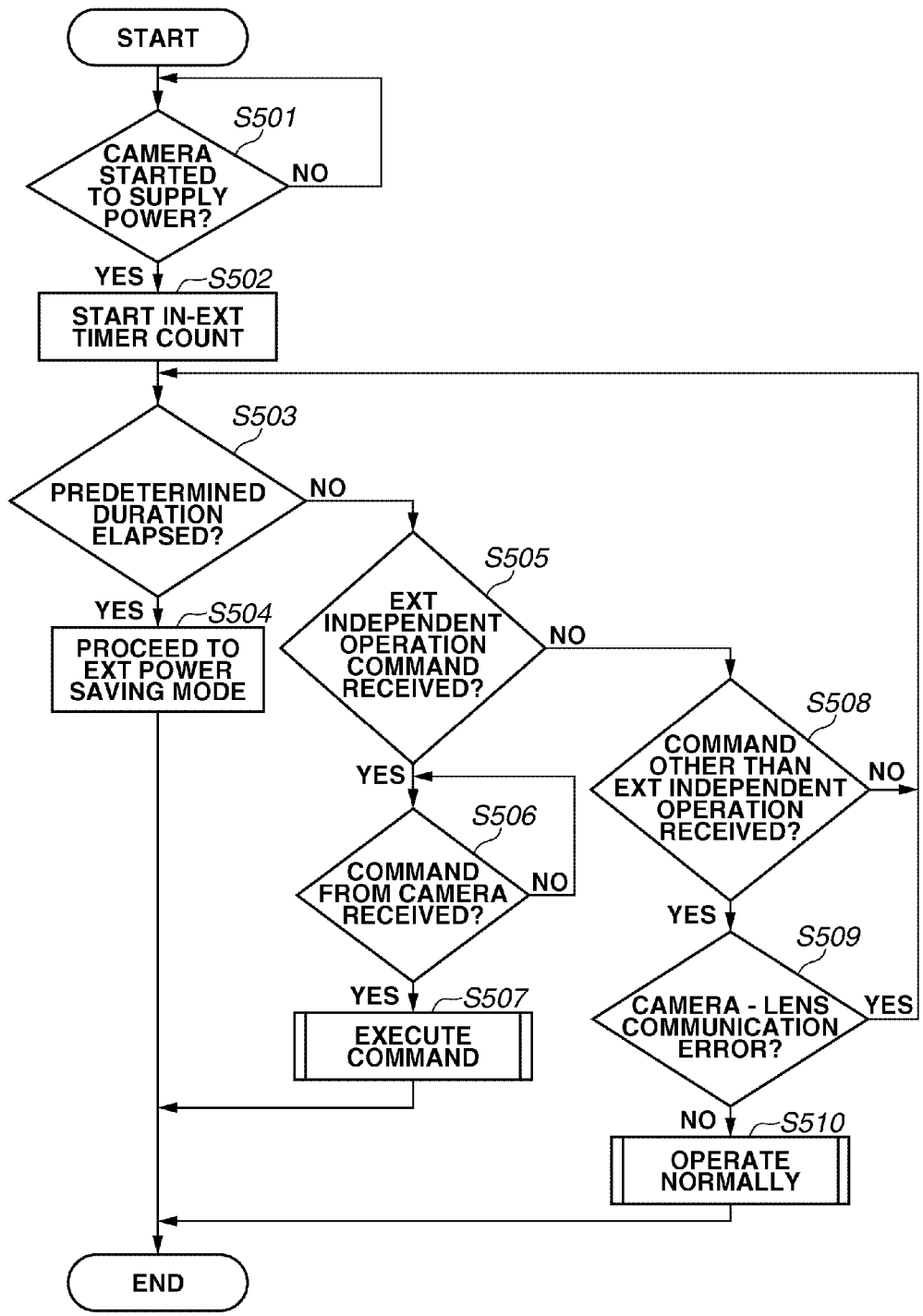
FIG. 5 is a flowchart according to the exemplary embodiment.

First, FIG. 4 illustrates a configuration of a camera system according to the present exemplary embodiment. In FIG. 4, the optical system 117 in the extender 105, and the main mirror 118 and the AF sensor 119 in the camera body 109 are omitted.

In the present exemplary embodiment, instead of the interchangeable lens 101 illustrated in FIG. 2, a mount protection cap 124 that lacks a CPU is attached as a pseudo interchangeable lens. The pseudo interchangeable lens is not limited to this. Other examples may include a dedicated tool that only has amount section identical to the interchangeable lens, and an accessory lacking an internal CPU. In any case, a unit that lacks a communication function with the camera body is desirable.

Further, a power supply circuit (power supply mechanism) is configured so that power starts to be supplied from the camera battery 112 to the mount protection cap 124, the extender 105, and the camera body 109 by connecting each of these units.

What is important here is that the mount protection cap 124 has the same mount shape as the interchangeable lens 101 so that it can be mounted on the extender 105. Thus, by attaching the mount protection cap 124 to the extender 105 the power supply start switch 113 is turned ON. Next, a processing flow in the camera system according to the present exemplary embodiment will be described using the flowchart of FIG. 5. First, in step S501, the extender 105 is attached to the camera body 109. Then, once the mount protection cap 124 is attached, the power supply start switch 113 is turned ON, and power starts to be supplied from the camera battery 112 to the EXT CPU 106. Attention needs to be paid so that the power supply is only started when all three of the camera body, the extender, and the mount protection cap are connected. The order in which the above three units are connected may be different. Once power supply is started, in step S502, counting of a timer included in the EXT CPU 106 starts. In step S503, based on the timer count value, the EXT CPU 106 determines whether a predetermined duration has elapsed from the power supply start. If the predetermined duration has not elapsed (NO in step S503), in step S505, the EXT CPU 106 determines whether an independent operation command (predetermined information) for the extender was sent from the camera CPU 110.

If the independent operation command was sent (YES in step S505), in step S506, the EXT CPU 106 next determines whether a command or data for rewriting the information stored in the storage unit 124 in the extender was sent. If such a command or data was sent (YES in step S506), in step S507, the EXT CPU 106 executes that command. Consequently, the information in the extender is rewritten. In the present exemplary embodiment, the most important feature is that if the independent operation command was sent within the predetermined duration from a device being attached, the extender and the camera body continue to communicate with each other even after the predetermined duration elapses, and the command is executed.

Although this "predetermined duration" may be set in advance, if the duration is too long, power consumption is increased, while if the duration is too short, it may be impossible to receive the independent operation command. Therefore, in consideration of these factors, the predetermined duration may be set, for example, at a few seconds.

The EXT CPU 106 determines whether to communicate with the camera body by determining whether an independent operation command was sent within the predetermined duration. However, the present invention is not limited to this configuration. Whether an independent operation command was transmitted to the EXT CPU 106 within the predetermined duration may be determined by the camera CPU 110. For example, the system may also be configured so that intercommunication with the EXT CPU 106 is enabled if the camera CPU 110 transmitted an independent operation command within the predetermined duration, while if the camera CPU 110 did not transmit an independent operation command within the predetermined duration, a command is issued to stop the power supply to the extender or to set the extender to a power saving state.

Further, in step S503, if the predetermined duration has elapsed (YES in step S503), the processing proceeds to step S504. In step S504, the EXT CPU 106 sets the whole or a part of the extender 105 system to a power saving state or turns the power off. The extender 105 includes a not-illustrated electric circuit and electric element. The term "whole system" refers to the whole electric system in the accessory 105 including that electric circuit and that electric element. Examples of a "power saving state" include a state in which the power supply to the circuit system in the interchangeable lens 101 is limited, a state in which the operating frequency of the lens CPU 102 is reduced, and a state in which arithmetic processing is stopped.

In step S505, if an independent operation command is not sent (NO in step S505), the processing proceeds to step S508. In step S508, the EXT CPU 106 determines whether a command other than an independent operation is sent. If a command other than the independent operation is received (YES in step S508), that command is transmitted by the camera CPU 110 to the lens CPU 102. In this case, the camera CPU 110 sends the command based on the assumption that the interchangeable lens 101 is mounted. However, in the present exemplary embodiment, since the interchangeable lens 101 is not mounted, a normal response to that command is not transmitted back to the camera CPU 110. The EXT CPU 106 can monitor this state via the communication terminal 108. In step S509, if the EXT CPU 106 detects that the normal response has not been transmitted back to the camera CPU 110, the EXT CPU 106 determines that a camera-lens communication error has occurred. In step S508, if a command other than an independent operation is not sent (NO in step S508), or in step S509, if a communication error is determined to have occurred (YES in step S509), the processing returns to step S503, and the EXT CPU 106 again determines whether the predetermined duration has elapsed since attachment. If the interchangeable lens 101 is mounted rather than the mount protection cap 124, in step S509, a communication error is not detected (NO in step S509), so that in step S510, the EXT CPU 106 proceeds to an ordinary imaging preparation operation.

The above description was of the processing flow in the camera system according to the present exemplary embodiment. In FIG. 4 referred to in the present exemplary embodiment, the camera body 109 is the actual camera body that performs imaging. The present exemplary embodiment is based on the assumption that, for example, the user uses this camera body to perform a firmware update for the extender. However, the present exemplary embodiment is not limited to this. For example, normal operation based on the above-described flowchart can also be performed if a tool, such as an extender adjustment tool, is attached to the camera body side.

According to the present exemplary embodiment, information in an accessory can be rewritten even in a state in which a pseudo interchangeable lens is mounted with the accessory. The present invention can be applied in a still camera or in a video camera. In the present invention, data in an accessory is rewritten by making the camera body and the accessory communicate with each other. Therefore, the data used for the rewriting first needs to be supplied to the camera body. This data may be supplied to the camera body by inserting a memory that stores the rewriting data into a slot provided on the camera body. Then, the camera body can transmit the data from the memory to the reading accessory. Further, the camera body can be connected to a personal computer (PC) by a cable, so that the camera body can transmit the data sent from the PC to the accessory.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-061058 filed Mar. 17, 2010, which is hereby incorporated by reference herein in its entirety.

What is claimed is:

1. A camera system comprising a camera body, an interchangeable lens, and an accessory mounted between the camera body and the interchangeable lens, wherein the accessory has a signal processing unit configured to process a signal input into the accessory and a storage unit configured to store information to be used when performing the signal processing, the camera system further comprising:
   a pseudo interchangeable lens which can be mounted on the accessory instead of the interchangeable lens and which is configured to supply power from the camera body to the accessory when mounted on the camera body via the accessory; and
   a control unit configured to, while the camera body, the accessory, and the pseudo interchangeable lens are connected, when the accessory receives within a predetermined duration predetermined information from the camera body, enable communication between the camera body and the accessory even after the predetermined duration has elapsed, and rewrite the information stored in the storage unit.

2. The camera system according to claim 1, wherein the pseudo interchangeable lens does not have a function for communicating with the camera body.

3. The camera system according to claim 1, wherein when the accessory has not received the predetermined information from the camera body within a predetermined duration from the start of power supply, the control unit is configured to set the accessory to a power saving state.

4. An accessory mounted between a camera body and an interchangeable lens, the accessory comprising:
   a storage unit; and
   a control unit configured to, when a pseudo interchangeable lens which can be mounted on the accessory instead of the interchangeable lens and which is configured to enable supply power from the camera body to the accessory when mounted on the camera body via the accessory, rewrite information in the storage unit when predetermined information is received from the camera body within a predetermined duration by enabling communication with the camera body after the predetermined duration has elapsed.

5. A camera body, comprising a control unit configured to, when a pseudo interchangeable lens which can be mounted on the camera body via an accessory having a storage unit and which is configured to supply power from the camera body to the accessory when mounted on the camera body via the accessory, supply information to be stored in the storage unit when the accessory receives predetermined information from the camera body within a predetermined duration by enabling communication with the accessory after the predetermined duration has elapsed.

6. A method for rewriting information stored in an accessory included in a camera system comprising a camera body, an interchangeable lens, and the accessory, which is mounted between the interchangeable lens and the camera body, the method comprising:
   mounting on the accessory a pseudo interchangeable lens configured to supply power from the camera body to the accessory when mounted on the camera body via the accessory;
   starting to supply power to the accessory from the camera body; and
   when the accessory receives predetermined information within a predetermined duration from the start of power supply, rewriting the information by performing communication between the camera body and the accessory even after the predetermined duration has elapsed.

* * * * *